(12) United States Patent
Zhang et al.

(10) Patent No.: US 12,524,485 B2
(45) Date of Patent: Jan. 13, 2026

(54) DYNAMICALLY GENERATING A STRUCTURED PAGE BASED ON USER INPUT

(71) Applicant: NETFLIX, INC., Los Gatos, CA (US)

(72) Inventors: Weidong Zhang, Cupertino, CA (US); Sudarshan D. Lamkhede, San Jose, CA (US); Michael Albert Galassi, San Jose, CA (US); Aisha Jackson Lei Fenton, San Francisco, CA (US); Yi Zhang, Hayward, CA (US); Fang Li, San Jose, CA (US); Sudeep Das, San Francisco, CA (US); Ivan Provalov, Scotts Valley, CA (US); Gary Yeh, New York, NY (US)

(73) Assignee: NETFLIX, INC., Los Gatos, CA (US)

( * ) Notice: Subject to any disclaimer, the term of this patent is extended or adjusted under 35 U.S.C. 154(b) by 8 days.

(21) Appl. No.: 17/978,864

(22) Filed: Nov. 1, 2022

(65) Prior Publication Data
US 2023/0214434 A1      Jul. 6, 2023

Related U.S. Application Data

(60) Provisional application No. 63/295,027, filed on Dec. 30, 2021.

(51) Int. Cl.
*G06F 16/9538*      (2019.01)
*G06F 16/735*       (2019.01)
(Continued)

(52) U.S. Cl.
CPC ........ *G06F 16/9538* (2019.01); *G06F 16/735* (2019.01); *G06F 16/738* (2019.01);
(Continued)

(58) Field of Classification Search
CPC .. G06F 16/9538; G06F 16/735; G06F 16/738; G06F 16/75; G06F 16/7867;
(Continued)

(56) References Cited

U.S. PATENT DOCUMENTS 9,129,227 B1 *   9/2015  Yee .................... G06N 3/047
9,615,136 B1     4/2017  Emery et al.
(Continued)

FOREIGN PATENT DOCUMENTS

WO       2015/034817 A1     3/2015

OTHER PUBLICATIONS

International Search Report for Application No. PCT/US2022/081922 dated Mar. 17, 2023.
Wikipedia, Gestalt Psychology, 21 pages, Nov. 5, 2022. https://en.wikipedia.org/wiki/Gestalt_psychology#Pr%C3%A4gnanz.

*Primary Examiner* — Sanchita Roy
(74) *Attorney, Agent, or Firm* — Artegis Law Group, LLP

(57) ABSTRACT

In various embodiments, structured pages are dynamically generated based on user inputs. In response to a user input such as a query, a page generating engine ranks content items according to relevance to the user input in order to generate a list of the content items that is ordered based on the relevance. The page generating engine further maps the content items to collections of content items that can be displayed together in a page. Then, the page generating engine generates a structured page that includes a subset of the collections and associated content items that are assigned to collections within the subset of collections based on relevance and/or coherence criteria. Thereafter, the structured page is transmitted to a client device for display via user interface.

20 Claims, 14 Drawing Sheets

|        | Col. 1 | Col. 2 | Col. 3 | Col. 4 | Col. 5 | Col. 6 | Col. 7 |
|--------|--------|--------|--------|--------|--------|--------|--------|
| Item 1 | 7      |        |        |        | 7      |        |        |
| Item 2 |        |        |        | 6      | 6      |        |        |
| Item 3 |        |        |        | 5      | 5      |        |        |
| Item 4 | 4      | 4      | 4      |        |        |        |        |
| Item 5 |        |        | 3      |        |        |        |        |
| Item 6 | 2      | 2      | 2      |        | 2      |        |        |
| Item 7 | 1      | 1      | 1      |        | 1      |        |        |

≈ 300

|        | Col. 1 | Col. 2 | Col. 3 | Col. 4 | Col. 5 |
|--------|--------|--------|--------|--------|--------|
| Item 1 | 7      |        |        |        | 7      |
| Item 2 |        |        |        | 6      | 6      |
| Item 3 |        |        |        | 5      | 5      |
| Item 4 | 4      | 4      | 4      |        |        |
| Item 5 |        |        | 3      |        |        |
| Item 6 | 2      | 2      | 2      |        | 2      |
| Item 7 | 1      | 1      | 1      |        | 1      |
|        | 14     | 7      | 10     | 11     | 21     |

≈ 310

(51) Int. Cl.
*G06F 16/738* (2019.01)
*G06F 16/75* (2019.01)
*G06F 16/78* (2019.01)
*G06F 40/284* (2020.01)
*G06N 5/022* (2023.01)

(52) U.S. Cl.
CPC .......... *G06F 16/75* (2019.01); *G06F 16/7867* (2019.01); *G06F 40/284* (2020.01); *G06N 5/022* (2013.01)

(58) Field of Classification Search
CPC ...... G06F 40/284; G06F 16/438; G06F 16/43; G06N 5/022; G06N 20/00
See application file for complete search history.

(56) References Cited

U.S. PATENT DOCUMENTS

| | | | |
|---|---|---|---|
| 2012/0096013 A1 | 4/2012 | Ciancutti et al. | |
| 2015/0205821 A1* | 7/2015 | Kogan | G06F 16/951 707/723 |
| 2017/0329490 A1* | 11/2017 | Esinovskaya | G06F 3/04817 |
| 2018/0075143 A1* | 3/2018 | Cardell | G06F 16/951 |
| 2018/0181569 A1* | 6/2018 | Jarr | G06Q 30/0603 |
| 2020/0133971 A1* | 4/2020 | Todd | H04L 65/60 |
| 2021/0240330 A1* | 8/2021 | Liusaari | G06F 3/0482 |
| 2021/0240924 A1* | 8/2021 | Siroker | G06F 9/451 |
| 2022/0035827 A1* | 2/2022 | McCann | G06F 16/954 |
| 2023/0156289 A1 | 5/2023 | Thaker et al. | |
| 2023/0245651 A1* | 8/2023 | Wang | G06N 5/022 704/275 |

* cited by examiner

|        | Col. 1 | Col. 2 | Col. 3 | Col. 4 | Col. 5 | Col. 6 | Col. 7 |
|--------|--------|--------|--------|--------|--------|--------|--------|
| Item 1 | 7      |        |        |        | 7      |        |        |
| Item 2 |        |        |        | 6      | 6      |        |        |
| Item 3 |        |        |        | 5      | 5      |        |        |
| Item 4 | 4      | 4      | 4      |        |        |        |        |
| Item 5 |        |        | 3      |        |        |        |        |
| Item 6 | 2      | 2      | 2      |        | 2      |        |        |
| Item 7 | 1      | 1      | 1      |        | 1      |        |        |

|        | Col. 1 | Col. 2 | Col. 3 | Col. 4 | Col. 5 |
|--------|--------|--------|--------|--------|--------|
| Item 1 | 7      |        |        |        | 7      |
| Item 2 |        |        |        | 6      | 6      |
| Item 3 |        |        |        | 5      | 5      |
| Item 4 | 4      | 4      | 4      |        |        |
| Item 5 |        |        | 3      |        |        |
| Item 6 | 2      | 2      | 2      |        | 2      |
| Item 7 | 1      | 1      | 1      |        | 1      |
|        | 14     | 7      | 10     | 11     | 21     |

|  | Col. 1 | Col. 2 | Col. 3 | Col. 4 | Col. 5 |
| --- | --- | --- | --- | --- | --- |
| Item 1 | 7 |  |  |  | 7 |
| Item 2 |  |  |  | 6 | 6 |
| Item 3 |  |  |  | 5 | 5 |
| Item 4 | 4 | 4 | 4 |  |  |
| Item 5 |  |  | 3 |  |  |
| Item 6 | 2 | 2 | 2 |  | 2 |
| Item 7 | 1 | 1 | 1 |  | 1 |

|  | Col. 1 | Col. 2 | Col. 3 | Col. 4 |
| --- | --- | --- | --- | --- |
| Item 3 |  |  |  | 5 |
| Item 4 | 4 | 4 | 4 |  |
| Item 5 |  |  | 3 |  |
| Item 6 | 2 | 2 | 2 |  |
| Item 7 | 1 | 1 | 1 |  |
|  | 7 | 7 | 10 | 5 |

|        | Col. 1 | Col. 2 | Col. 3 | Col. 4 | Col. 5 |
|--------|--------|--------|--------|--------|--------|
| Item 1 | 20     |        |        |        | 20     |
| Item 2 |        |        |        | 20     | 3      |
| Item 3 |        |        |        | 20     | 5      |
| Item 4 | 10     |        | 15     |        |        |
| Item 5 |        |        | 20     |        |        |
| Item 6 | 5      | 20     | 10     |        | 5      |
| Item 7 | 10     | 20     | 5      |        | 10     |

|        | Col. 1 | Col. 2 | Col. 3 | Col. 4 | Col. 5 |
|--------|--------|--------|--------|--------|--------|
| Item 1 | 20     |        |        |        | 20     |
| Item 2 |        |        |        | 20     | 3      |
| Item 3 |        |        |        | 20     | 5      |
| Item 4 | 10     |        | 15     |        |        |
| Item 5 |        |        | 20     |        |        |
| Item 6 | 5      | 20     | 10     |        | 5      |
| Item 7 | 10     | 20     | 5      |        | 10     |

|  | Col. 1 | Col. 2 | Col. 3 | Col. 4 | Col. 5 |
|---|---|---|---|---|---|
| Item 1 | 20 |  |  |  | 20 |
| Item 2 |  |  |  | 20 | 3 |
| Item 3 |  |  |  | 20 | 5 |
| Item 4 | 10 |  | 15 |  |  |
| Item 5 |  |  | 20 |  |  |
| Item 6 | 5 | 20 | 10 |  | 5 |
| Item 7 | 10 | 20 | 5 |  | 10 |

# DYNAMICALLY GENERATING A STRUCTURED PAGE BASED ON USER INPUT

CROSS-REFERENCE TO RELATED APPLICATIONS

This application claims priority benefit of the United States Provisional Patent Application titled, "REAL-TIME GENERATION OF STRUCTURED SEARCH RESULTS," filed on Dec. 30, 2021 and having Ser. No. 63/295,027. The subject matter of this related application is hereby incorporated herein by reference.

BACKGROUND OF THE INVENTION

Field of the Invention

Embodiments of the present invention relate generally to computer science and, more specifically, to dynamically generating a structured page based on user input.

Description of the Related Art

Providing access to content items in response to user input is an important aspect of many content distribution systems. For instance, many content distribution systems permit users to search for available content items. A graphical user interface (GUI) can be used to display information about content items identified during the search via a page.

One approach for displaying information about content items that are identified during a search is to display thumbnails of those content items within a grid, which is also referred to as a "gallery view." Conventional content distribution systems lack the technical infrastructure to organize content items identified during a search beyond a gallery view of content items. In addition, search engines are oftentimes expected to return results relatively quickly. Conventional content distribution systems do not have the capability to quickly organize content items identified during a search.

As the foregoing illustrates, what is needed in the art are more effective techniques for generating an organized page of content items.

SUMMARY OF THE INVENTION

One embodiment of the present invention sets forth a computer-implemented method for generating a page. The method includes determining, for each of a plurality of content items, an associated relevance score based on a user input. The method further includes assigning one or more content items included in the plurality of content items to one or more lists of content items based on one or more relevance scores associated with the one or more content items, where each list of content items is associated with a predefined collection of content items. The method also includes generating the page that indicates the one or more lists of content items. In addition, the method includes causing the page to be displayed via a user interface.

One advantage of the disclosed techniques is that a technical infrastructure is provided for dynamically generating a structured page of content items in response to user input, including user input that has not been previously encountered. The structured page of content items can provide more useful information to a user relative to a gallery view of content items. In addition, the disclosed techniques permit a structured page of content items to be generated relatively quickly, such as within a few hundred milliseconds. These technical advantages represent one or more technological advancements over prior art approaches.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

FIGS. 3A-3D illustrate exemplary page building operations, according to various embodiments;

FIG. 4A illustrates an exemplary assignment of content items to lists associated with collections of content items, according to various embodiments;

FIG. 4B illustrates another exemplary assignment of content items to lists associated with collections of content items, according to various other embodiments;

FIG. 4C illustrates another exemplary assignment of content items to lists associated with collections of content items, according to various other embodiments;

DETAILED DESCRIPTION

In the following description, numerous specific details are set forth to provide a more thorough understanding of the present invention. However, it will be apparent to one of skill in the art that the present invention may be practiced without one or more of these specific details.

System Overview

Figure 1:
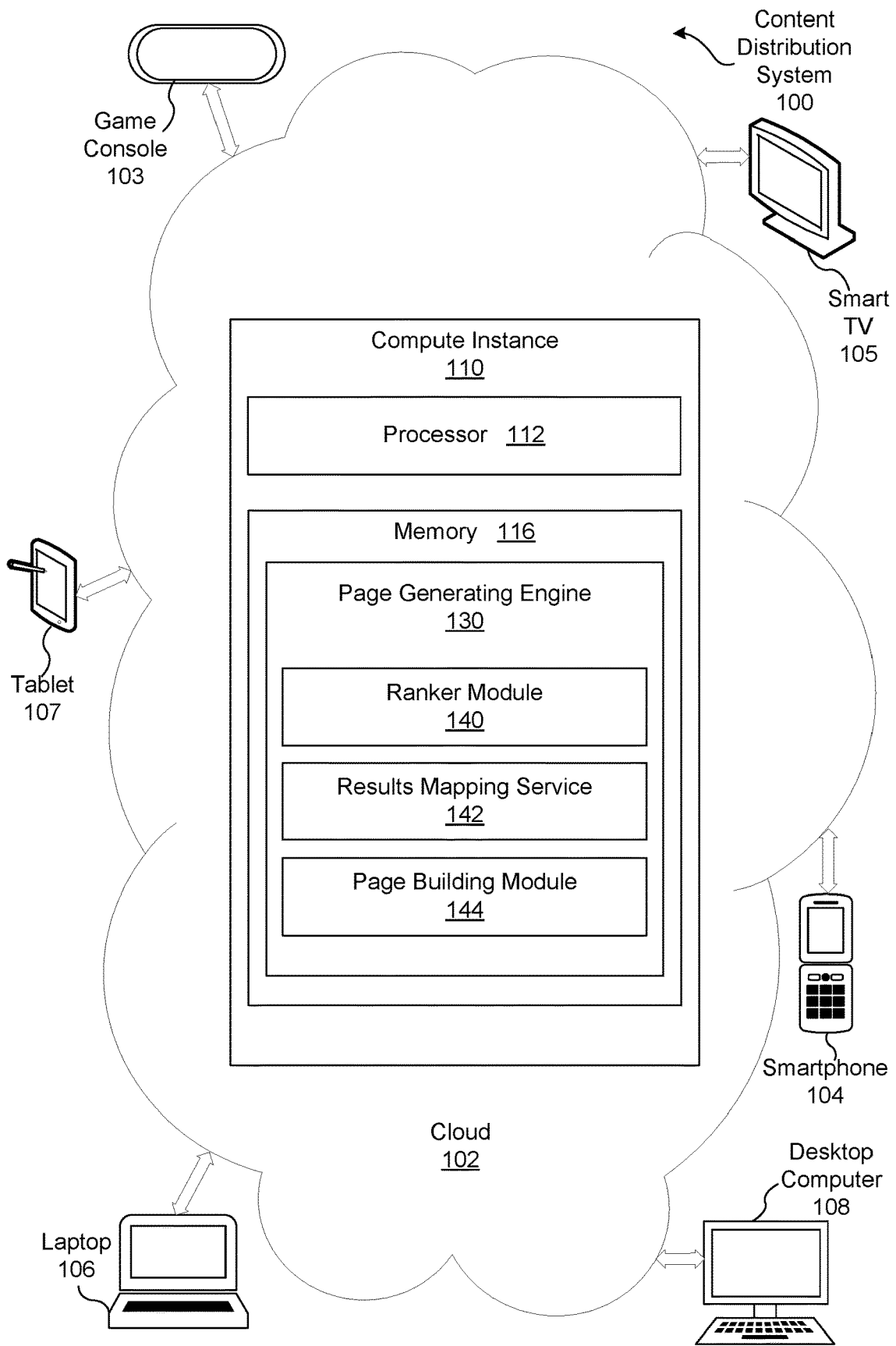
FIG. 1 is a conceptual illustration of a content distribution system configured to implement one or more aspects of the present invention.

FIG. 1 is a conceptual illustration of a content distribution system 100 configured to implement one or more aspects of the present invention. As shown, the content distribution system 100 includes a cloud (i.e., encapsulated shared resources, software, data, etc.) 102 connected to a variety of client devices capable of transmitting user data and/or displaying content items. The client devices include, without limitation, a game console 103, a smartphone 104, a smart television 105, a laptop 106, a tablet 107, and a desktop computer 108. In alternative embodiments, the content distribution system 100 may include any number and/or type of client devices in any combination.

As used herein, a content item refers to any item that includes content, such as video content, audio content, text content, etc. or any combination thereof. Content items can be manipulated (e.g., stored, encoded, compressed, transmitted, etc.) using any mechanisms known in the art. For example, a video content item, such as a movie, could be stored as a compressed audio-video file, transmitted via the internet, and then decompressed for display purposes.

In some embodiments, one or more of the client devices are capable of running a web browser, or other application, that is configured to display a graphical user interface (GUI) that enables the user to interact with content items and/or view information associated with the content items. The implementation of the GUI may differ based on the client device. For example, the laptop 106 or the desktop computer 108 could be configured to present the graphical user interface via a web-browser to enable users to browse content items, select content items, download content items, and/or playback content items.

The cloud 102 includes, without limitation, any number and type of compute instances 110. The cloud 102 receives input user data from a client device (e.g., the laptop 106 or the desktop computer 108), one or more compute instances 110 operate on the input user data, and the cloud 102 transmits processed information to the user. The cloud 102 conveys output information to the user via display capabilities of any number of client devices, such as a conventional cathode ray tube, liquid crystal display, light-emitting diode, or the like.

In other embodiments, the content distribution system 100 may include any distributed computer system instead of the cloud 102. In yet other embodiments, the content distribution system 100 does not include the cloud 102 and, instead, the content distribution system 100 includes a single computing unit that implements multiple processing units (e.g., central processing units and/or graphical processing units in any combination).

As shown, each of the compute instances 110 includes, without limitation, a processor 112 and a memory 116. The processor 112 may be any instruction execution system, apparatus, or device capable of executing instructions. For example, the processor 112 could comprise a central processing unit (CPU), a graphics processing unit (GPU), a controller, a microcontroller, a state machine, or any combination thereof. The memory 116 stores content, such as software applications and data, for use by the processor 112 of the compute instance 110.

The memory 116 may be one or more of a readily available memory, such as random access memory (RAM), read only memory (ROM), floppy disk, hard disk, or any other form of digital storage, local or remote. In some embodiments, a storage (not shown) may supplement or replace the memory 116. The storage may include any number and type of external memories that are accessible to the processor 112. For example, and without limitation, the storage may include a Secure Digital Card, an external Flash memory, a portable compact disc read-only memory (CD-ROM), an optical storage device, a magnetic storage device, or any suitable combination of the foregoing.

In general, the compute instances 110 included in the cloud 102 are configured to implement one or more applications. More specifically, the compute instances 110 implement applications that deliver content items to the client devices over a network. For instance, in some embodiments, the compute instances 110 implement applications that deliver both video and audio streams associated with video content items over the Internet to the smart television 105.

In operation, the content distribution system 100 permits users to search for available content items. A GUI can be used to display information about content items identified during the search via a page. Illustratively, a page generating engine 130 is stored in the memory 116, and executes on the processor 112, of compute instance 110. In some embodiments, the page generating engine 130 is configured to dynamically generate structured pages based on user inputs. The page generating engine 130 includes a ranker module 140, a results mapping service 142, and a page building module 144, which are discussed in greater detail below in conjunction with FIG. 2.

Generating a Structured Page of Content Items

Figure 2:
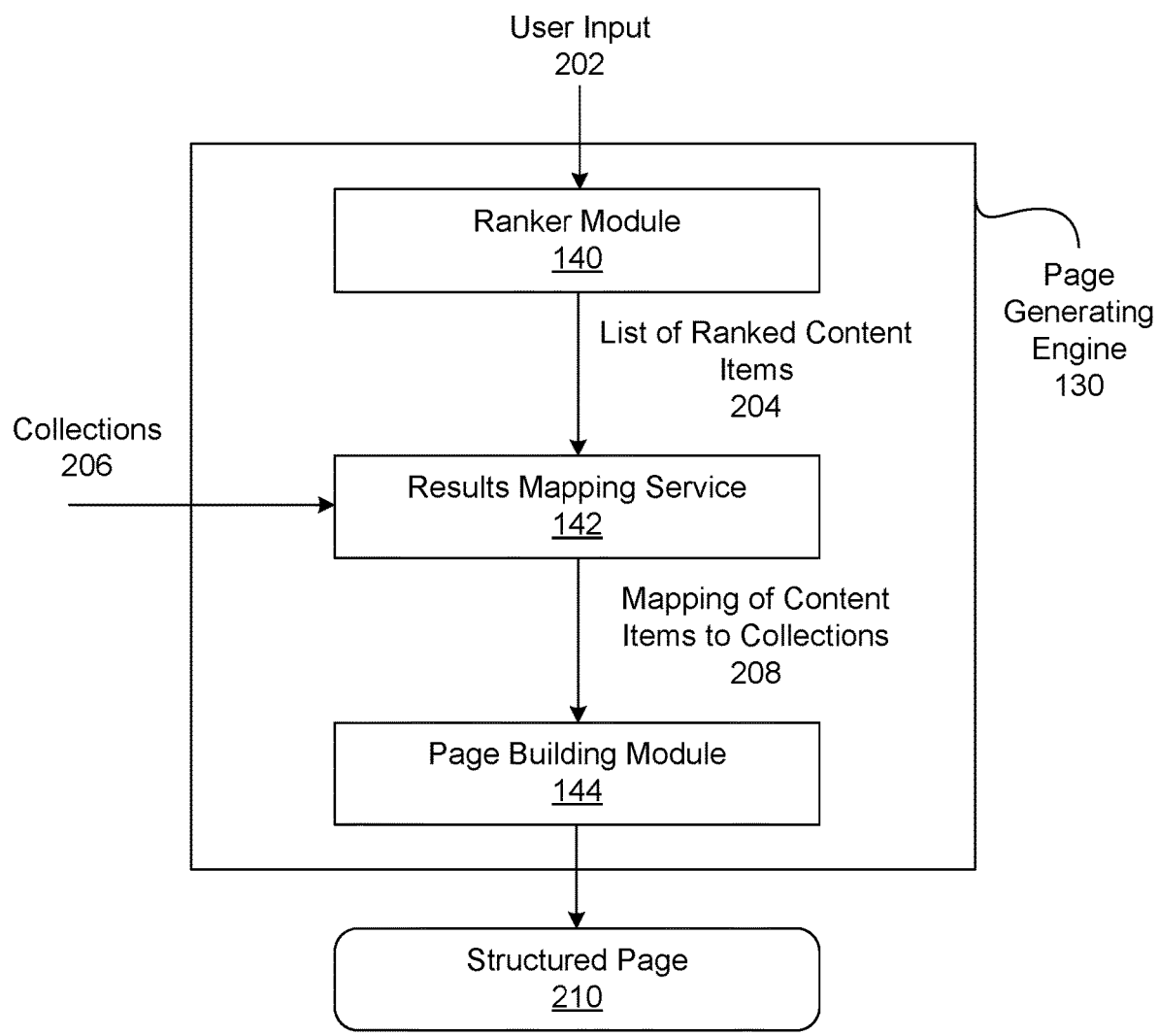
FIG. 2 is a more detailed illustration of the page generating engine of FIG. 1, according to various embodiments of the present invention.

FIG. 2 is a more detailed illustration of the page generating engine 130 of FIG. 1, according to various embodiments of the present invention. As shown, in operation, the ranker module 140 in the page generating engine 130 receives user input 202. The user input 202 can be a previously encountered user input, or a user input that has not previously been encountered. The ranker module 140 ranks available content items according to relevance to the user input 202 and outputs a list of ranked content items 204. As used herein, a list refers to a set of items that is ordered. The list of ranked content items 204 indicates an ordering of content items based on the relevance to the user input. For example, the user input could be a search query, and the list of ranked content items 204 could include identifiers (IDs) of content items ordered according to relevance to the search query. As another example, the user input could specify content items that a user likes, and the list of ranked content items 204 could include IDs of content items ordered according to similarity to the specified content items.

In some embodiments, the ranker module 140 can generate the list of ranked content items 204 in any technically feasible manner. In some embodiments, the ranker module 140 generates the list of ranked content items 204 using a trained machine learning model, lexical matching, and/or a combination thereof. For example, in some embodiments, the ranker module 140 scores each content item for relevance to the user input based on a lexical match to the user input. In such cases, the lexical match can match text and/or portions thereof from the user input to text and/or portions thereof that are associated with the content items using n-gram matching and/or any other technically feasible technique. For example, assume the user input is a search query, the content items are media content items, and each media content item is associated with metadata indicating a title, genre, etc. of the media content item. In such a case, text and/or portions thereof from the user input can be matched to text of the title, genre, etc. and/or portions thereof to identify media content items that are relevant to the search query.

Additionally or alternatively, in some embodiments, the ranker module 140 scores each of the content items for relevance to the user input using a machine learning model that was trained on previous user behavior data. The previous user behavior data can include data indicating user inputs and subsequent interactions with content items. Examples of interactions include clicking on the content items, viewing the content items, and viewing the content items for a certain period of time. The previous user behavior data can be recorded and stored in any technically feasible manner, such as via logs. Using such previous user behavior data and optionally negative examples as training data, a machine learning model can be trained to output a relevance score for a content item given a user input. Any suitable machine learning model can be trained, such as a feedforward neural network with skip connections that takes (1) user input (and potentially other related data such as time and locale of the user input), and (2) a particular content item as inputs and outputs, as a relevance score, the probability of a positive class representing a likelihood that the user will interact with the particular content item. In some embodiments, the machine learning model is trained offline and re-trained periodically (e.g., every day). The trained machine learning model can be applied to determine relevance scores for a number of content items to the user input 202, and the relevance scores are used to generate the list of ranked content items 204.

Additionally or alternatively, in some embodiments, the ranker module 140 can generate the list of ranked content items 204 by inputting the user input 202 into a search engine that outputs a list of content items. The list of content items that is output by the search engine can be used directly as the list of ranked content items 204, or modified in any technically feasible manner to create the list of ranked content items 204.

In some embodiments, content items in the list of ranked content items 204 can be ordered by relevance scores in descending order from the largest relevance score to the smallest relevance score. In such cases, the first content item in the list of ranked content items 204 can be assigned a rank of 1, the second content item can be assigned a rank of 2, etc., and the last item can be assigned a rank of N, assuming the list of ranked content items 204 includes N distinct content items. It should be noted that the reciprocal of the rank is 1.0/rank, where rank is a number in the range of 1 to N. More generally, in some embodiments, the relevance score of a content item in a list of ranked content items can be any function f(rank), with f(rank)=1.0/rank being one example function.

The page generating engine 130 further includes the results mapping service 142, which maps content items in the list of ranked content items 204 to collections 206 of content items that can be displayed together in a page. Any suitable number (e.g., hundreds or thousands) of collections 206 of content items can be used in some embodiments. In some embodiments, each collection of content items is associated with a genre, actor, director, time period, franchise, musician, locale, set, or the like. For example, a "comedy" collection could include a number of movies that belong to the comedy genre. In some embodiments, each collection of content items can be chosen to not be too broad (e.g., including more than a given number of content items, such as more than 50 content items) or too narrow (e.g., including less than a given number of content items, such as less than 3 content items), and to not overlap too much with other collections. In some embodiments, the collections 206 can be manually curated, and each content item can be assigned to zero or more collections. In such cases, the assignments of content items to collections can be specified in any technically feasible manner, such as in metadata associated with the content items. The results mapping service 142 maps content items in the list of ranked content items 204 to collections to which those content items belong based on the previous assignments of content items to collections. Illustratively, the results mapping service 142 outputs a mapping of content items to collections 208. The mapping of content items to collections 208 indicates the collection(s) to which each content item belongs. For example, the mapping of content items to collections 208 could indicate identifiers (IDs) of content items belonging to particular collections.

In addition, the page generating engine 130 includes the page building module 144, which takes (1) the list of ranked content items 204, generated by the ranker module 140, and (2) the mapping of content items to collections 208, generated by the results mapping service 142, as inputs and generates a structured page 210 that includes a subset of the collections and associated content items that are assigned to lists associated with particular collections and ordered within those lists based on relevance and/or coherence criteria. In some embodiments, the page building module 144 can perform a greedy optimization technique that packs content items into lists of content items associated with collections that have the highest relevance scores, as discussed in greater detail below in conjunction with FIGS. 3A-3E, 4A, and 9. In some embodiments, the page building module 144 can perform a greedy and coherent optimization technique that assigns content items to lists of content items associated with collections in a manner that maximizes a combination of relevance and coherence scores, as discussed in greater detail below in conjunction with FIGS. 4B and 10. In some other embodiments, the page building module 144 can perform any technically feasible optimization technique, such as the constraint programming/constraint satisfaction technique described in greater detail below in conjunction with FIG. 4C, to assign content items to lists of content items associated with collections. Thereafter, a structured page that indicates the lists of content items associated with collections can be transmitted to a client device for display via user interface. Although described herein primarily with respect to generating and transmitting a single structured page, in some embodiments, multiple structured pages can be generated according to techniques described herein. For example, in some embodiments, an initial structured page is first generated using a greedy optimization technique that executes relatively quickly, and the initial structured page is transmitted to a client device. Thereafter, an updated structured page is generated using another optimization technique that executes more slowly, and the updated structured page is then transmitted to the client device.

FIGS. 3A-3D illustrate exemplary page building operations, according to various embodiments. In some embodiments, the page generating engine 130 (and, specifically, the page building module 144 of the page generating engine 130) can perform a greedy optimization technique that packs content items into lists of content items that are associated with collections and that have the highest relevance scores. FIG. 3A illustrates the mapping of content items to collections 208 represented as a matrix 300 whose columns represent candidate lists of content items that are associated with collections 1-7. Each entry in the matrix 300 is a relevance score of one of the content items 1-7 to a user input. The relevance scores are generated by the ranker module 140 in some embodiments. Although described herein primarily with respect to relevance scores for simplicity, in some embodiments, the page building module 144 can consider other values derived from the relevance scores. In some embodiments, each candidate list of content items can be displayed as a row of content items assigned to a corresponding collection. As shown in FIG. 3A, the page generating engine 130 first removes from consideration collections 6 and 7 (shown in ghosted lines), to which too few content items are mapped. In some embodiments, the page generating engine 130 can remove collections to which too few (e.g., less than three) or too many (e.g., greater than 30% of the result list) content items are mapped. Collections to which too few content items map do not include enough content items for a user to select among. Collections to which too many content items map can be too broad and overlap with other collections. Any suitable numbers of content items can be used as the thresholds for whether too few or too many content items map to a collection in some embodiments.

FIG. 3B illustrates a matrix 310 after the columns associated with collections 6-7 are removed. In addition, FIG. 3B shows the assignment of content items 1, 2, 3, 6, and 7 to a list of content items associated with collection 5 because the sum of the relevance scores of content items 1, 2, 3, 6, and 7, which were mapped to collection 5, is 21. The sum of the relevance scores of content items that were mapped to other collections 1-4 are lower than 21. Accordingly, the page generating engine 130 greedily selects the list of content items 1, 2, 3, 6, and 7 assigned to collection 5 for inclusion in a page. For example, the list of content items 1, 2, 3, 6, and 7 could be displayed as a first row in the page. In addition, the content items in the first row could be ordered in descending order of relevance scores so that the user sees the most relevant content item first as the user scrolls horizontally from left to right in the first row.

FIG. 3C illustrates a deduplication operation in which content items 1 and 2 (shown in ghosted lines) are removed from consideration when assigning content items to additional lists of content items associated with collections. In some embodiments, the page generating engine 130 deduplicates content items within each candidate list of content items against all content items of the lists that have been selected to include in the page so far and that are within the visible width of the page. Such a deduplication of content items ensures that content items displayed in any list of content items within the visible width of the page are not displayed again in another list of content items, so that a user does not see the same content items repeatedly within different lists of content items. The example of FIG. 3C assumes that two content items from each list of content items are within the visible width of the page at any given time. Accordingly, the first two content items 1 and 2 that were assigned to the list of content items associated with collection 5 are removed from further consideration. In addition, collection 5 is no longer considered after the list of content items assigned to collection 5 is selected for inclusion in the page.

FIG. 3D illustrates a matrix 320 after the column associated with collection 5 and the rows associated with content items 1-2 are removed. In addition, FIG. 3D shows the assignment of content items 4, 5, 6, and 7 to a list of content items associated with collection 3 because the sum of the relevance scores of content items 4, 5, 6, and 7, which were mapped to collection 3, is 10. The sum of the relevance scores of content items that were mapped to other collections 1-2 and 4 are lower than 10. Accordingly, the page generating engine 130 greedily selects the list of content items 4, 5, 6, and 7 assigned to collection 5 for inclusion in the page. For example, the list of content items 4, 5, 6, and 7 could be displayed as a second row in the page after the first row, described above in conjunction with FIG. 3B. Similar to the first row, the content items in the second row could be ordered in descending order of relevance scores so that the user sees the most relevant content item first as the user scrolls horizontally from left to right of the second row. The selection process illustrated in FIGS. 3A-3D can be repeated until a terminating condition is satisfied, such as when a given number (e.g., 20) of lists of content items associated with different collections have been selected.

Figure 3E:
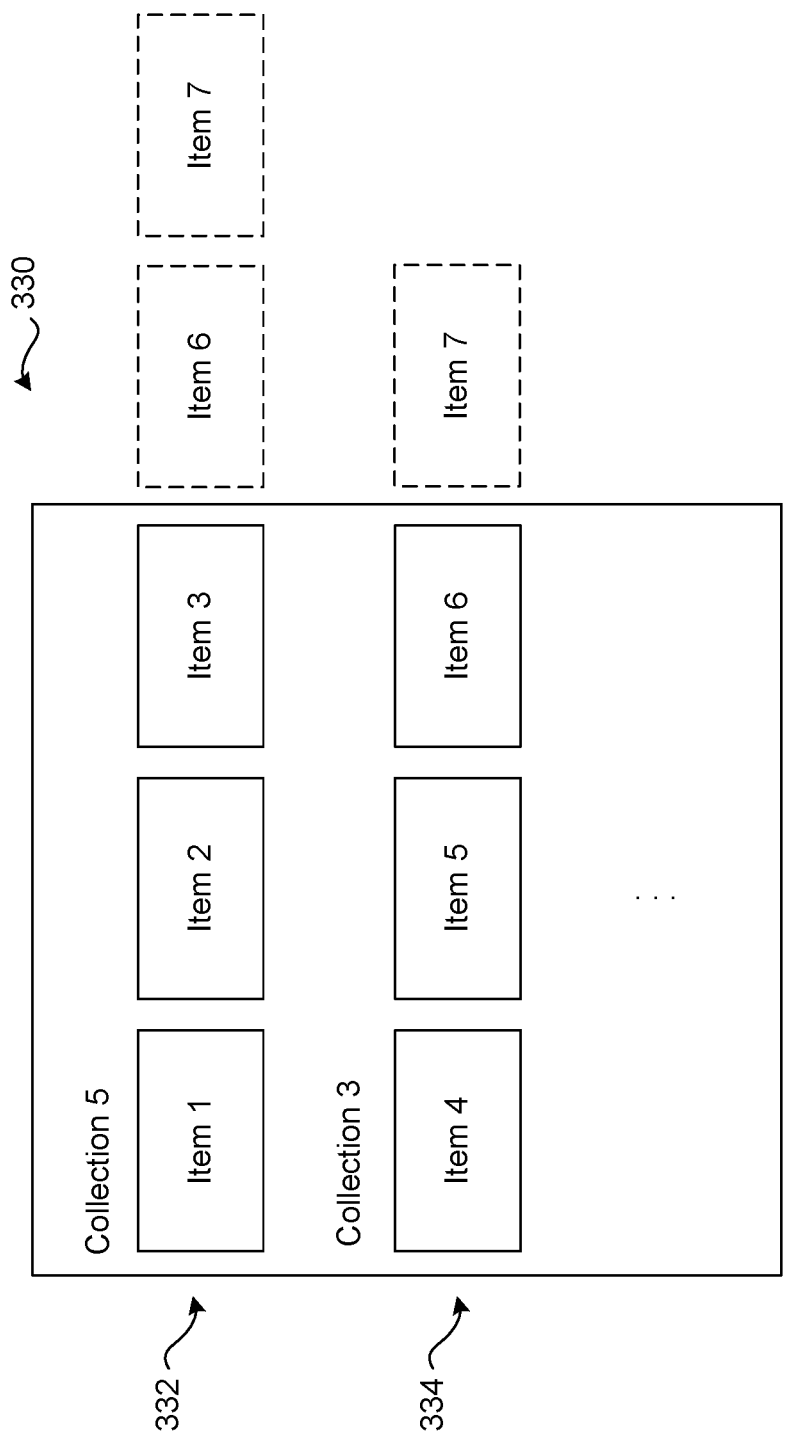
FIG. 3E illustrates an exemplary page that includes lists generated via the page building operations of FIGS. 3A-D, according to various embodiments.

FIG. 3E illustrates an exemplary page 330 that includes lists generated via the page building operations of FIGS. 3A-D, according to various embodiments. As shown, the page 330 includes a first row 332 indicating content items 1, 2, 3, 6, and 7 that are assigned to the list of content items associated with collection 5, as described above in conjunction with FIG. 3B. In addition, the page 330 includes a second row 334 indicating content items 4, 5, 6, and 7 that are assigned to the list of content items associated with collection 3, as described above in conjunction with FIG. 3D. In the first row 332, the content items 1, 2, and 3 are within the visible width of the page 330 and are not displayed again in any subsequent row. The content items 6 and 7 in the first row 332 are not within the visible width of the page 330 and can be displayed again in a subsequent row. In the second row 334, the content items 4, 5, and 6 are within the visible width of the page 330 and are not displayed again in any subsequent row. The content item 7 in the second row 334 is not within the visible width of the page 330 and can be displayed again in a subsequent row.

Illustratively, rows (e.g., rows 332 and 334) of the page 330 are ordered from most relevant (the first row 332) to least relevant to the user input. In addition, within each row of the page 330, content items are ordered in descending order of relevance scores. Such an order permits the user to see the most relevant rows and content items in the visible width of the page 330 (e.g., a viewport of the user device) first. In particular, if the user browses the page 330 vertically, then the most relevant rows are shown first. In addition, if the user scrolls horizontally through any given row of the page 330, then the most relevant items are shown first within the given row.

Although two rows 332 and 334 are shown for illustrative purposes, the page 330 can include any number of additional rows (not shown) for lists associated with other collections of content items, as well as a catch-all row (not shown) that includes content items that are not assigned to lists associated with collections of content items.

FIG. 4A illustrates an exemplary assignment of content items to lists associated with collections of content items, according to various embodiments. The assignment of content items to lists of content items in FIG. 4A was made using the greedy optimization technique described above in conjunction with FIGS. 3A-3D. As shown, a matrix 400 includes columns representing candidate lists of content items that are associated with collections 1-5. Each entry in the matrix 400 is a combination of a relevance score generated by the ranker module 140 and a coherence score indicating (1) a relative strength to which a collection associated with the candidate list (relative to other collections) represents the content item, and/or (2) a similarity between the content item and other content items that are mapped to the collection. However, using only relevance and the greedy optimization technique described above in conjunction with FIGS. 3A-3D, the page generating engine 130 selects for inclusion in a page (1) content items 4, 5, 6, and 7 that are assigned to a list of content items associated with collection 3; and (2) content items 1, 2, 3, 6 and 7 that are assigned to a list of content items associated with collection 5.

FIG. 4B illustrates another exemplary assignment of content items to lists associated with collections of content items, according to various other embodiments. The assignment of content items to lists of content items in FIG. 4C was made using a greedy and coherent optimization technique that assigns content items to lists of content items associated with collections in a manner that maximizes the combination of relevance and coherence scores indicated by the elements of a matrix 410. As shown, the page generating engine 130 selects for inclusion in a page (1) content items 2 and 3 that are assigned to a list of content items associated with collection 4; (2) content items 6 and 7 that are assigned to a list of content items associated with collection 2; and (3) content items 1 and 4 that are assigned to a list of content items associated with collection 1. Notably, the sum of the scores associated with the content items in the selected lists of content items is 110, which is greater than the sum of the scores associated with the content items in the selected lists of content items for the greedy optimization technique described above in conjunction with FIG. 4A, which is 93. However, the greedy optimization technique is, as a general matter, faster than the greedy and coherent optimization technique. In some embodiments, structured pages generated using the greedy and coherent optimization technique can be cached for future retrieval in order to improve performance.

FIG. 4C illustrates another exemplary assignment of content items to lists associated with collections of content items, according to various other embodiments. The assignment of content items to lists of content items in FIG. 4D, shown in matrix 420, was made using a constraint programming/constraint satisfaction (CP-SAT) technique. The CP-SAT technique can be used to solve the optimization problem of assigning content items to lists of content items that are associated with collections to which the content items map. As shown, using the CP-SAT technique, the page generating engine 130 selects for inclusion in a page (1) content items 2 and 3 that are assigned to a list of content items associated with collection 4; (2) content items 6 and 7 that are assigned to a list of content items associated with collection 2; and (3) content items 1 and 4 that are assigned to a list of content items associated with collection 1. Notably, the sum of the scores associated with the content items in the selected lists of content items is 110, which is greater than the sum of the scores associated with the content items in the selected lists of content items for the greedy optimization technique described above in conjunction with FIG. 4A, which is 93. However, the greedy optimization technique is, as a general matter, faster than the CP-SAT technique. In some embodiments, structured pages generated using relatively slow optimization techniques, such as the CP-SAT technique, can be cached for future retrieval in order to improve performance. It should be noted that some optimization techniques, such as the CP-SAT technique, may not assign every content item to a list of content items associated with a collection. In some embodiments, content items that are not assigned to a list of content items may be assigned to a catch-all list of content items.

Figure 5:
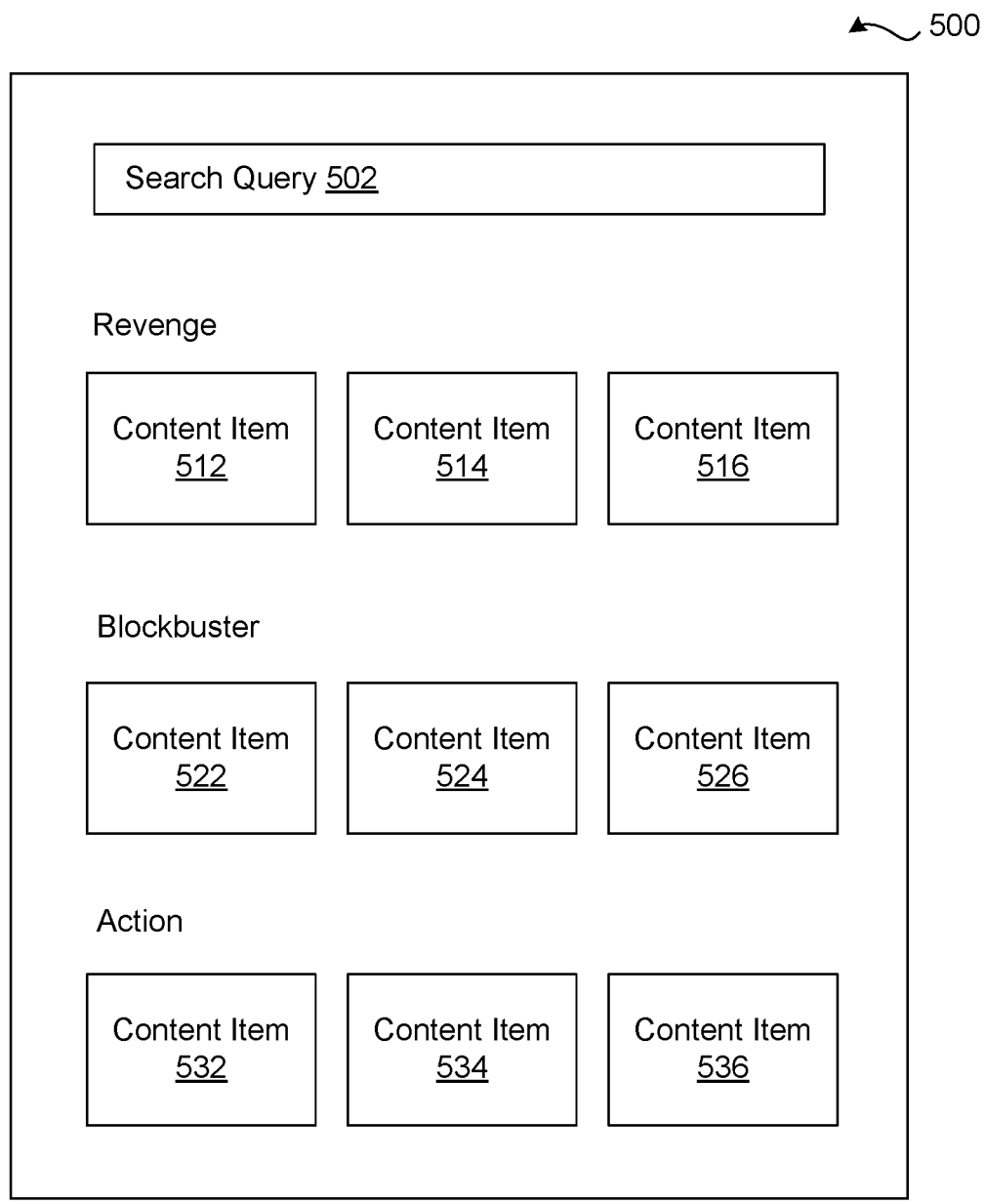
FIG. 5 illustrates an exemplary structured page, according to various embodiments.

FIG. 5 illustrates an exemplary structured page 500, according to various embodiments. As shown, the structured page 500 displays a number of content items 512, 514, 516, 522, 524, 526, 532, 534, and 536 that are relevant to a search query 502. Illustratively, the content items 512, 514, 516 are assigned to a list of content items associated with the "Revenge" collection and displayed in a first row within the exemplary structured page 500. Although rows are described herein as an illustrative example, lists of content items can be displayed in any suitable manner (e.g., as columns, grids, etc.) in some embodiments. The rows in structured page 500 can be ordered based on relevance to the search query 502 and/or coherence, such as using the greedy optimization technique, the greedy and coherent optimization technique, and/or another optimization technique, described in conjunction with FIGS. 2-4 and 9-11. The content items 522, 524, 526 are assigned to a list of content items associated with the "Blockbuster" collection and displayed in a second row within the exemplary structured page 500. Illustratively, the content items 532, 534, 536 are assigned to a list of content items associated with the "Action" collection and displayed in a third row within the exemplary structured page 500. In some embodiments, content items can be assigned to lists of content items associated with collections, and the lists of content items can be selected for inclusion in a page, according to the techniques that are described above in conjunction with FIGS. 2-4 and below in conjunction with FIGS. 6-11.

Figure 6:
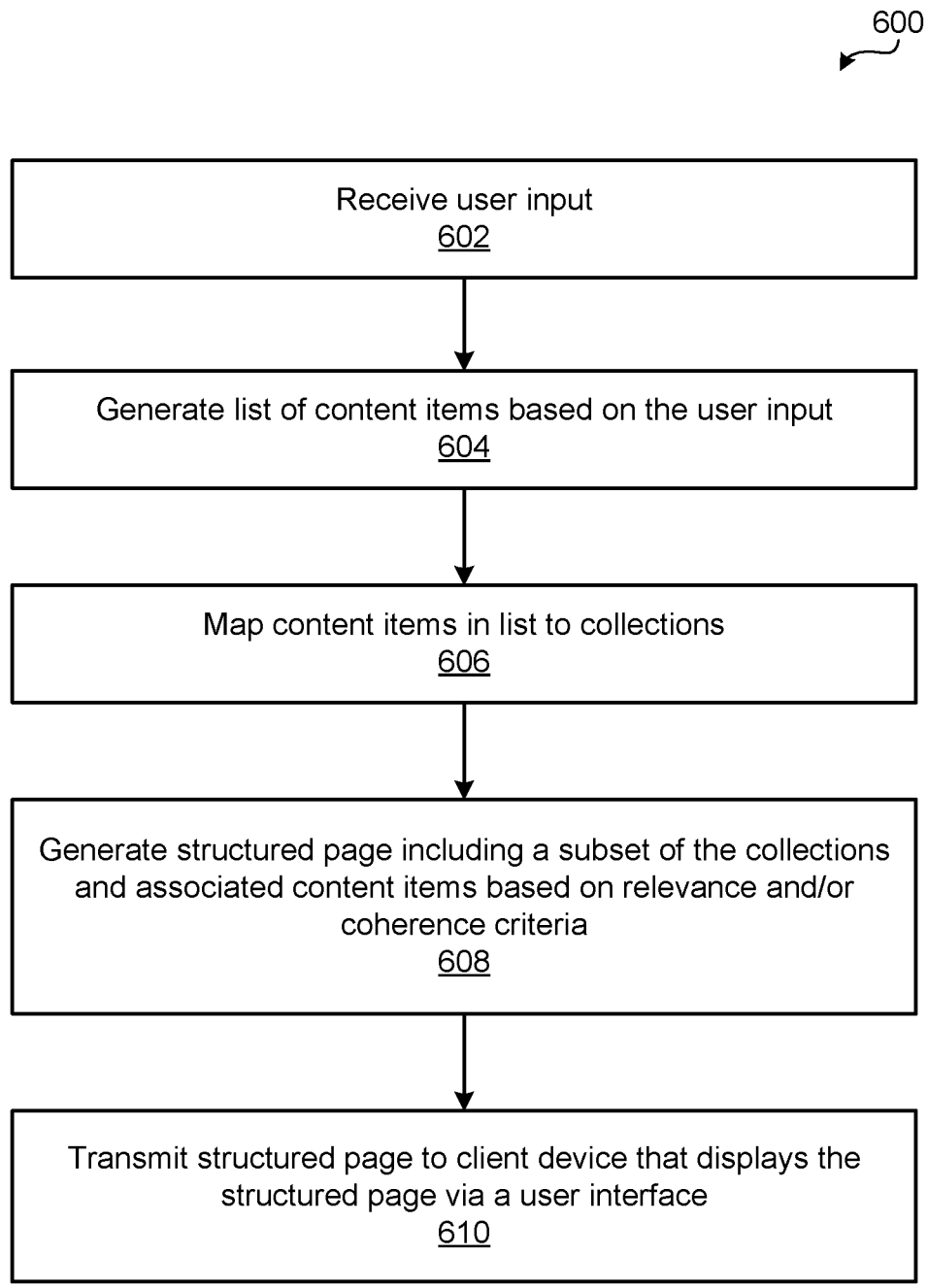
FIG. 6 is a flow diagram of method steps for generating a structured page, according to various embodiments.

FIG. 6 is a flow diagram of method steps for generating a structured page, according to various embodiments. Although the method steps are described with reference to the systems of FIGS. 1-2, persons skilled in the art will understand that any system configured to implement the method steps, in any order, falls within the scope of the present invention.

As shown, a method 600 begins at step 602, where the page generating engine 130 receives user input. In some embodiments, the user input can be a search query. In some embodiments, the user input can be a specification of one or more content items.

At step 604, the page generating engine 130 generates a list of ranked content items based on the user input. For example, in some embodiments, the list of N ranked content items can be in the form [{c_1, score_1}, {c_2, score_2}, . . . , {c_N, score_N}], where c_i is the ith content item and score_i is the score associated with the ith content item. In some embodiments, the page generating engine 130 generates the list of ranked content items using a trained machine learning model, lexical matching, and/or a combination thereof. Steps for generating a list of ranked content items using a trained machine learning model and lexical matching are described in greater detail below in conjunction with FIG. 7. In some embodiments, the page generating engine 130 generates the list of ranked content items using the output of a search engine, into which the page generating engine 130 inputs the user input. Steps for generating a list of ranked content items using a search engine are described in greater detail below in conjunction with FIG. 8.

At step 606, the page generating engine 130 maps content items in the list of ranked content items to a number of collections of content items. For example, in some embodiments, the mapped output can be in the form [{C_1, content items: [c1_1, c_1_2, . . . ]}, [{C_2, content items: [c2_1, c_2_2, . . . ]} . . . ], where C_i is the ith collection and ci_j is the $j^{th}$ content item mapping to the $i^{th}$ collection. Each collection can include any number of content items, and each content item can belong to zero or more collections. The associations between content items and collections can be specified in any technically feasible manner. For example, in some embodiments, metadata associated with each content item can specify collection(s) to which the content item belongs.

At step 610, the page generating engine 130 generates a structured page that includes a subset of the collections and associated content items that are assigned to the collections within the subset of collections based on relevance and/or coherence criteria. Steps for generating the structured page based on relevance criteria according to a greedy technique are described in greater detail below in conjunction with FIG. 9. Steps for generating the structured page based on both relevance criteria and coherence criteria are described in greater detail below in conjunction with FIG. 10. Steps for generating the structured page based on relevance and coherence criteria using an optimization technique are described in greater detail below in conjunction with FIG. 11.

At step 610, the page generating engine 130 transmits the structured page to a client device that displays the structured page via a user interface. The structured page can be transmitted via any technically feasible network, such as the Internet, in some embodiments.

Figure 7:
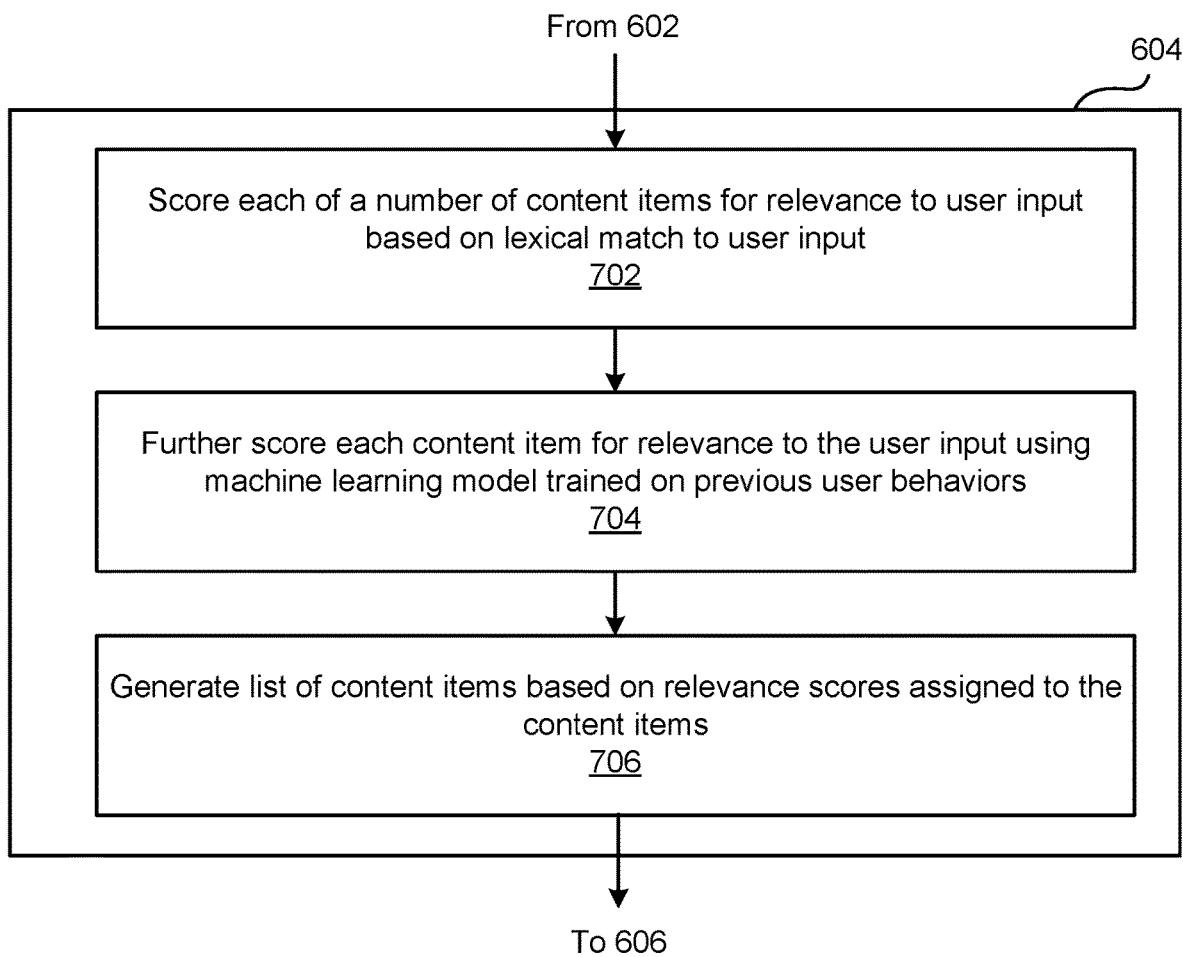
FIG. 7 illustrates in greater detail one of the steps of the method of FIG. 6, according to various embodiments.

FIG. 7 illustrates in greater detail generating the list of ranked content items at step 604 of the method 600 of FIG. 6, according to various embodiments. Although the method steps are described with reference to the systems of FIGS. 1-2, persons skilled in the art will understand that any system configured to implement the method steps, in any order, falls within the scope of the present invention.

As shown, at step 702, the page generating engine 130 scores each of a number of content items for relevance to the user input based on a lexical match to the user input. As described, in some embodiments, the lexical match can include matching text and/or portions thereof from the user input to text and/or portions thereof that are associated with the content items using, e.g., n-gram matching or any other technically feasible technique.

At step 704, the page generating engine 130 further scores each of the content items for relevance to the user input using a machine learning model trained on previous user behavior data. In some embodiments, the user input (and potentially other related data such as time and locale of the user input) and each content item is input is turn into the machine learning model, which outputs a probability of a positive class representing the likelihood the user will interact with the content item as the relevance score.

At step 706, the page generating engine 130 generates a list of ranked content items based on the relevance scores assigned to the content items. The scores that are computed at steps 702 and 704 for each content item can be combined in any technically feasible manner (e.g., as a weighted sum) to generate an overall relevance score for the content item that is used to order the content items in the list of ranked content items. Although steps 702 and 704 are described as separate steps, steps 702 and 704 can be combined into a single step in some embodiments. In such cases, features for a machine learning model can be generated from both a lexical match and user behavior data. The features can then be used to train a machine learning model (e.g., a neural network model) offline. Thereafter, the trained machine learning model can be deployed to generate relevant scores for candidate content items online in real-time for a given user input.

In some embodiments, the list generated at step 706 can include content items sorted from highest to lowest relevance scores, or vice versa. Although described herein primarily with respect to a list, in some embodiments, the assignments of relevance scores to content items can be stored in any technically feasible manner.

Figure 8:
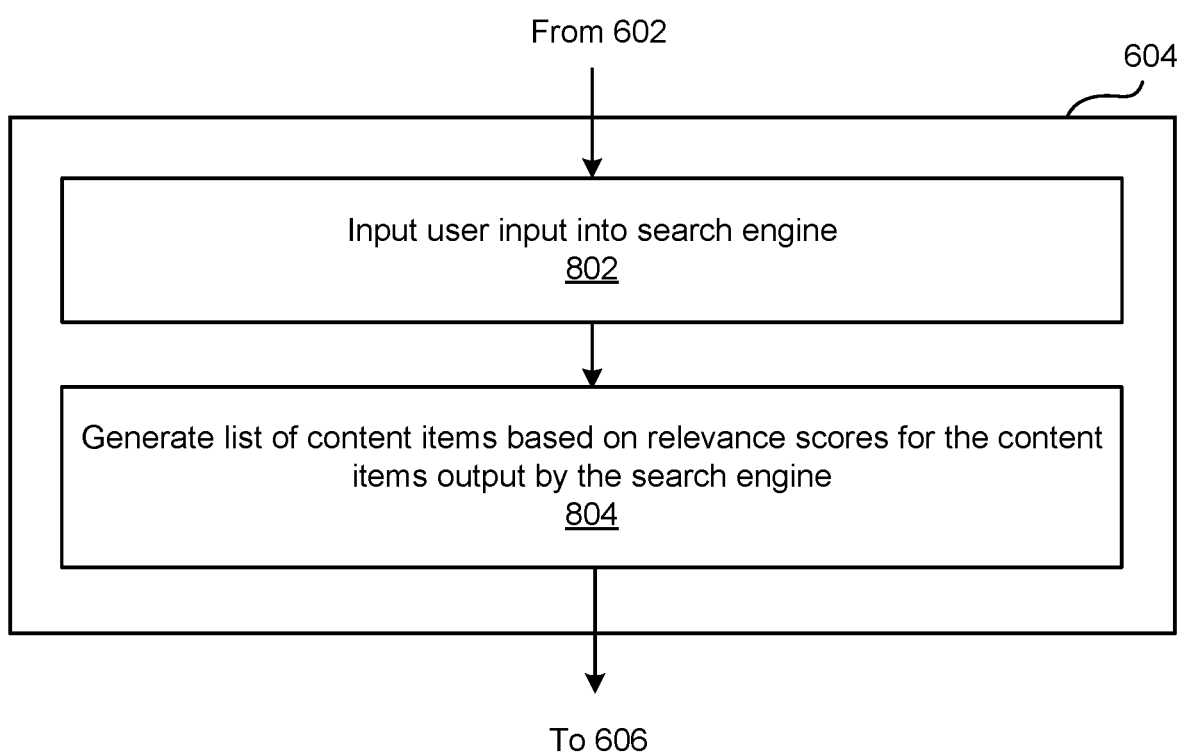
FIG. 8 illustrates in greater detail one of the steps of the method of FIG. 6, according to various other embodiments.

FIG. 8 illustrates in greater detail generating the list of ranked content items at step 604 of the method 600 of FIG. 6, according to various other embodiments. Although the method steps are described with reference to the systems of FIGS. 1-2, persons skilled in the art will understand that any system configured to implement the method steps, in any order, falls within the scope of the present invention.

As shown, at step 802, the page generating engine 130 inputs the user input into a search engine. The search engine returns available content items that are relevant to the user input. In some embodiments, the search engine returns relevance scores indicating how relevant each content item is to the user input. In some other embodiments, relevance scores can be derived in any technically feasible manner (e.g., based on the ranking of content items) from the output of the search engine.

At step 804, the page generating engine 130 generates a list of ranked content items based on relevance scores for the content items output by the search engine. Similar to step 706, described above in conjunction with FIG. 7, the list of ranked content items can include content items sorted from highest to lowest relevance scores, or vice versa. Although described herein primarily with respect to a list, in some embodiments, the assignments of relevance scores to content items can be stored in any technically feasible manner.

Figure 9:
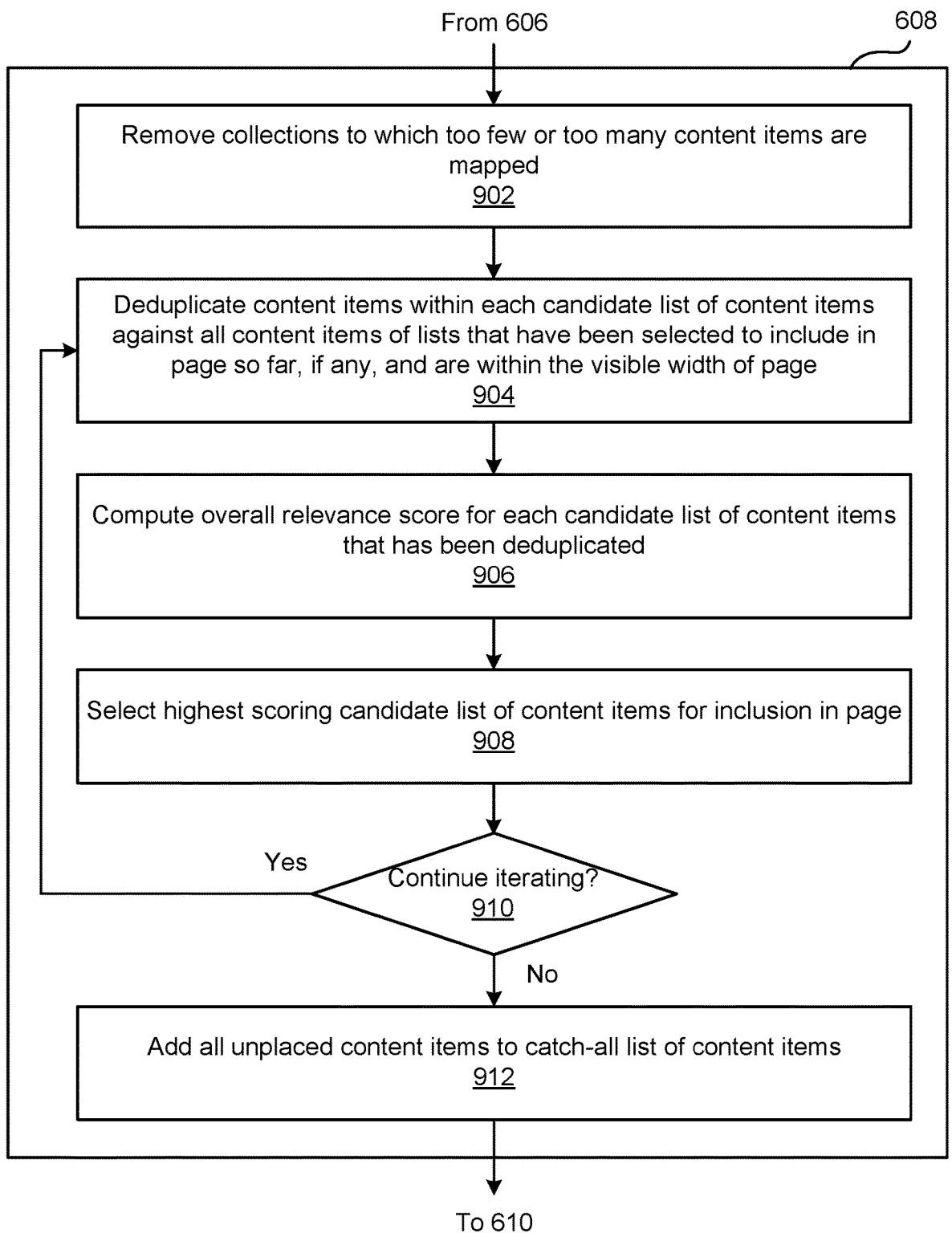
FIG. 9 illustrates in greater detail another one of the steps of the method of FIG. 6, according to various embodiments.

FIG. 9 illustrates in greater detail generating the structured page at step 608 of the method 600 of FIG. 6, according to various embodiments. Although the method steps are described with reference to the systems of FIGS. 1-2, persons skilled in the art will understand that any system configured to implement the method steps, in any order, falls within the scope of the present invention.

As shown, at step 902, the page generating engine 130 removes collections to which too few or too many content items are mapped. As described, any suitable numbers of content items can be used as the thresholds for whether too few (e.g., less than 3) or too many (e.g., greater than 50 or 30% of the result list) content items map to a collection. Collections to which too few content items map do not include enough content items for a user to select among. Collections to which too many content items map can be too broad and overlap with other collections.

At step 904, the page generating engine 130 deduplicates content items within each candidate list of content items that are associated with a collection against all content items of lists that have been selected to include in the page so far, if any, and that are within the visible width of the page. In some embodiments, each candidate list of content items can be displayed as a row of content items assigned to a corresponding collection. In such cases, the deduplication at step 904 can be performed for the current candidate list/row against all rows that have been included in the page so far. The deduplication of content items at step 904 ensures that content items displayed in any list of content items within the visible width of the page are not displayed again in another list of content items.

At step 906, the page generating engine 130 computes an overall relevance score for each candidate list of content items that has been deduplicated. In some embodiments, the page generating engine 130 computes the overall relevance score for a candidate list of content items by summing together the relevance scores for each content item belonging to the candidate list of content items. Although described herein primarily with respect to summing together all of the relevance scores for the content items in a candidate list of content items, in some embodiments, only the relevance scores of the top K content items (e.g., K=3) are summed together, where top K is the first K content items in the candidate list of content items in descending order of relevance scores.

At step 908, the page generating engine 130 selects a highest scoring candidate list of content items for inclusion in the page. The highest scoring candidate list is a candidate list that is most relevant to the user input.

At step 910, if the page generating engine 130 determines to continue iterating, then the method 600 returns to step 904, where the page generating engine 130 again deduplicates content items within each candidate list of content items associated with a collection against all content items of lists that have been selected to include in the page so far, if any, and that are within the visible width of the page. In some embodiments, the page generating engine 130 continues iterating until a given number (e.g., 20) of candidate lists of content items have been selected for inclusion in the page. For example, the page generating engine 130 could continue iterating until a given number of candidate lists of content items corresponding to rows have been selected for inclusion in the page.

On the other hand, if the page generating engine 130 determines to stop iterating, then the method 600 continues to step 912, where the page generating engine 130 adds all unplaced content items to a catch-all list of content items for inclusion in the page. Unplaced content items are content items that have not already been assigned to a list of content items included in the page. Returning to the example of a page that includes rows corresponding to lists of content items, the page that has been constructed after step 912 can include the following characteristics in some embodiments: (1) the most relevant list/collection can be placed as the first row of this page, the second most relevant list/collection can be placed the second row of this page, and so on, until the least relevant list/collection is placed as the second to last row of this page, and the catch-all list is placed as the last row of the page, thereby permitting a user who browses the page from top to bottom to see the most relevant row first; and (2) in every row, the content items are ordered in descending order of relevance scores to the user input so that the users sees the most relevant content item first in a given row when scrolling horizontally from left to right in the given row, as described above in conjunction with FIG. 3E.

Figure 10:
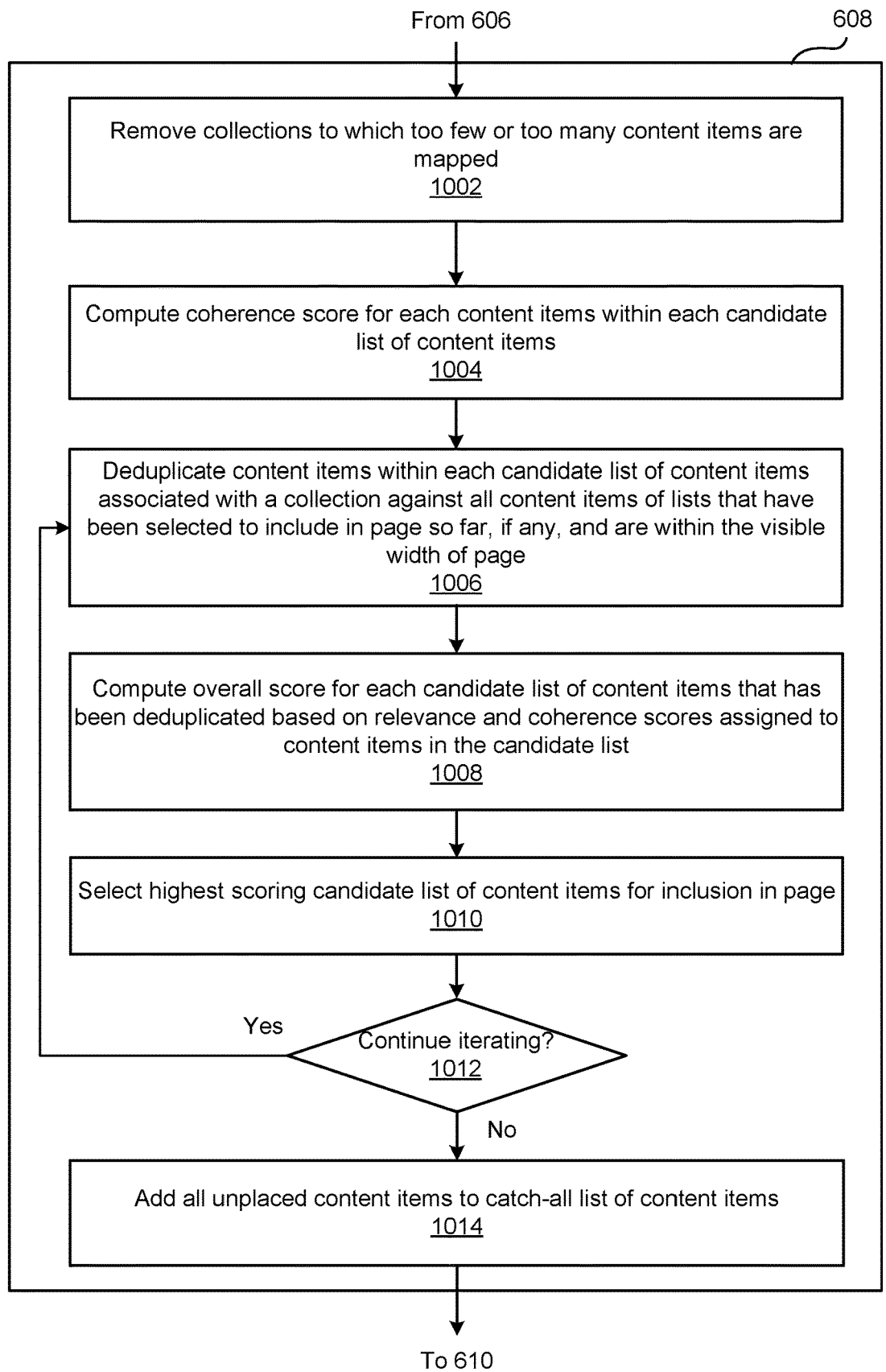
FIG. 10 illustrates in greater detail another one of the steps of the method of FIG. 6, according to various other embodiments.

FIG. 10 illustrates in greater detail generating the structured page at step 608 of the method 600 of FIG. 6, according to various other embodiments. Although the method steps are described with reference to the systems of FIGS. 1-2, persons skilled in the art will understand that any system configured to implement the method steps, in any order, falls within the scope of the present invention.

As shown, at step 1002, the page generating engine 130 removes collections to which too few or too many content items are mapped. Step 1002 is similar to step 902, described above in conjunction with FIG. 9.

At step 1004, the page generating engine 130 computes a coherence score for each content item within each candidate list of content items. In some embodiments, the coherence score for a content item within a candidate list indicates (1) a relative strength to which a collection associated with the candidate list (relative to other collections) represents the content item, and/or (2) a similarity between the content item and other content items that are mapped to the collection. For example, the similarity between the content item and other content items that are mapped to the candidate list can be determined based on the similarity of metadata tags associated with those content items.

At step 1006, the page generating engine 130 deduplicates content items within each candidate list of content items against all content items of lists that have been selected to include in the page so far, if any, and that are within the visible width of the page. The deduplication in step 1006 is similar to step 904, described above in conjunction with FIG. 9.

At step 1008, the page generating engine 130 computes an overall score for each candidate list of content items that has been deduplicated based on the relevance and coherence scores assigned to content items in the candidate list. The overall score can be computed in any technically feasible manner in some embodiments, such as via a straight or weighted sum of the relevance and coherence scores.

At step 1010, the page generating engine 130 selects a highest scoring candidate list of content items for inclusion in a page. The highest scoring candidate list is a candidate list associated with a score indicating the highest combination of relevance to the user input and coherence.

At step 1012, if the page generating engine 130 determines to continue iterating, then the method 600 returns to step 1006, where the page generating engine 130 again deduplicates content items within each candidate list of content items associated with a collection against all content items of lists that have been selected to include in the page so far, if any, and that are within the visible width of the page. Similar to step 910, described above in conjunction with FIG. 9, the page generating engine 130 continues iterating in some embodiments until a given number (e.g., 20) of candidate lists of content items have been selected for inclusion in the page.

On the other hand, if the page generating engine 130 determines to stop iterating, then the method 600 continues to step 1014, where the page generating engine 130 adds all unplaced content items to a catch-all list of content items for inclusion in the page. Step 1014 is similar to step 912, described above in conjunction with FIG. 9.

Figure 11:
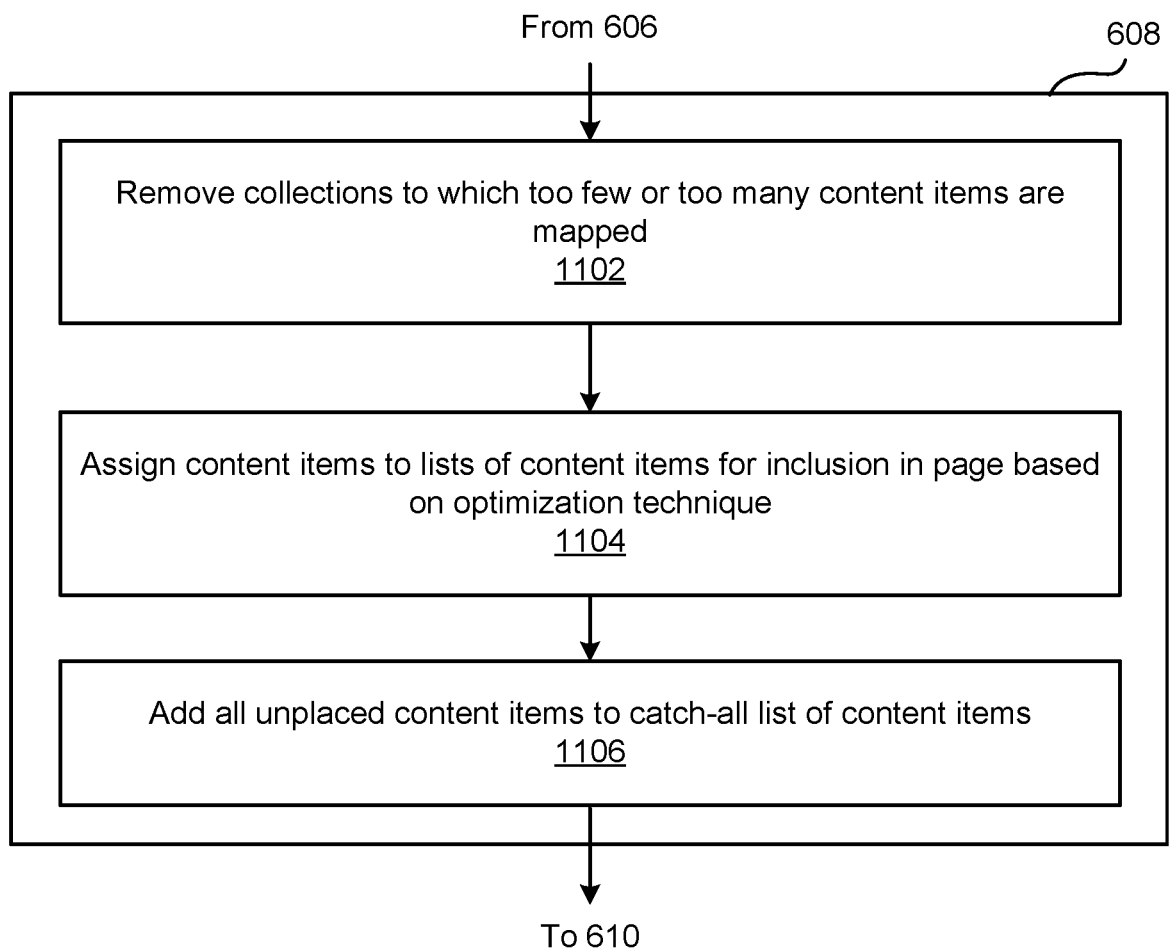
FIG. 11 illustrates in greater detail another one of the steps of the method of FIG. 6, according to various other embodiments.

FIG. 11 illustrates in greater detail generating the structured page at step 608 of the method 600 of FIG. 6, according to various other embodiments. Although the method steps are described with reference to the systems of FIGS. 1-2, persons skilled in the art will understand that any system configured to implement the method steps, in any order, falls within the scope of the present invention.

As shown, at step 1102, the page generating engine 130 removes collections to which too few or too many content items are mapped. Step 1102 is similar to step 902, described above in conjunction with FIG. 9.

At step 1104, the page generating engine 130 assigns content items to lists of content items for inclusion in a page based on an optimization technique. Any technically feasible optimization technique can be employed in some embodiments. For example, in some embodiments, a CP-SAT technique can be used to solve the optimization problem of assigning content items to lists of content items that are associated with collections to which the content items map.

At step 1106, the page generating engine 130 adds all unplaced content items to a catch-all list of content items for inclusion in the page. Step 1106 is similar to step 912, described above in conjunction with FIG. 9.

In sum, the disclosed techniques dynamically generate structured pages based on user inputs. In response to a user input such as a query, a page generating engine ranks content items according to relevance to the user input in order to generate a list of the content items that is ordered based on relevancy. The page generating engine further maps the content items to collections of content items that can be displayed together in a page. Then, the page generating engine generates a structured page that includes a subset of the collections and associated content items that are assigned to collections within the subset of collections based on relevance and/or coherence criteria. Thereafter, the structured page is transmitted to a client device for display via a user interface.

One advantage of the disclosed techniques is that a technical infrastructure is provided for dynamically generating a structured page of content items in response to user input, including user input that has not been previously encountered. The structured page of content items can provide more useful information to a user, such as content items belonging to the same collection being placed within the same row in the structured page, relative to a gallery view of content items. In addition, the disclosed techniques permit a structured page of content items to be generated relatively quickly, such as within a few hundred milliseconds. These technical advantages represent one or more technological advancements over prior art approaches.

1. In some embodiments, a computer-implemented method comprises determining, for each of a plurality of content items, an associated relevance score based on a user input, assigning one or more content items included in the plurality of content items to one or more lists of content items based on one or more relevance scores associated with the one or more content items, wherein each list of content items is associated with a predefined collection of content items, generating a page that indicates the one or more lists of content items, and causing the page to be displayed via a user interface.

2. The computer-implemented method of clause 1, wherein determining the associated relevance score comprises processing the user input via a machine learning model.

3. The computer-implemented method of clauses 1 or 2, further comprising training the machine learning model based on one or more other user inputs and one or more subsequent user interactions with the plurality of content items.

4. The computer-implemented method of any of clauses 1-3, wherein determining the associated relevance score comprises performing one or more lexical matching operations.

5. The computer-implemented method of any of clauses 1-4, wherein determining the associated relevance score comprises processing the user input via a search engine.

6. The computer-implemented method of any of clauses 1-5, further comprising mapping each of the plurality of content items to one or more predefined collections.

7. The computer-implemented method of any of clauses 1-6, wherein assigning the one or more content items to the one or more lists of content items comprises performing one or more optimization operations.

8. The computer-implemented method of any of clauses 1-7, wherein the one or more optimization operations include one or more greedy assignment operations based on the one or more relevance scores.

9. The computer-implemented method of any of clauses 1-8, further comprising determining, for each content item included in the plurality of content items, one or more coherence scores based on similarities between the content item and other content items that map to one or more predefined collections that the content item maps to, wherein the one or more optimization operations include one or more assignment operations based on one or more combinations of the one or more relevance scores and one or more coherence scores.

10. The computer-implemented method of any of clauses 1-9, wherein causing the page to be displayed comprises transmitting the page to a client device that displays the page.

11. In some embodiments, one or more non-transitory computer-readable storage media include instructions that, when executed by one or more processing units, cause the one or more processing units to the perform steps of determining, for each of a plurality of content items, an associated relevance score based on a user input, assigning one or more content items included in the plurality of content items to one or more lists of content items based on one or more relevance scores associated with the one or more content items, wherein each list of content items is associated with a predefined collection of content items, generating a page that indicates the one or more lists of content items, and causing the page to be displayed via a user interface.

12. The one or more non-transitory computer-readable storage media of clause 11, wherein determining the associated relevance score comprises processing the user input via a machine learning model.

13. The one or more non-transitory computer-readable storage media of clauses 11 or 12, wherein the instructions, when executed by the processor, further cause the processor to perform the step of training the machine learning model based on one or more other user inputs and one or more subsequent user interactions with the plurality of content items.

14. The one or more non-transitory computer-readable storage media of any of clauses 11-13, wherein determining the associated relevance score comprises performing one or more lexical matching operations.

15. The one or more non-transitory computer-readable storage media of any of clauses 11-14, wherein determining the associated relevance score comprises processing the user input via a search engine.

16. The one or more non-transitory computer-readable storage media of any of clauses 11-15, wherein the instructions, when executed by the processor, further cause the processor to perform the step of mapping each of the plurality of content items to one or more predefined collections.

17. The one or more non-transitory computer-readable storage media of any of clauses 11-16, wherein assigning the one or more content items to the one or more lists of content items comprises performing one or more optimization operations.

18. The one or more non-transitory computer-readable storage media of any of clauses 11-17, wherein the one or more optimization operations include one or more greedy assignment operations based on the one or more relevance scores.

19. The one or more non-transitory computer-readable storage media of any of clauses 11-18, wherein the instructions, when executed by the one or more processor, further cause the one or more processors to perform the step of determining, for each content item included in the plurality of content items, one or more coherence scores based on similarities between the content item and other content items that map to one or more predefined collections that the content item maps to, wherein the one or more optimization operations include one or more assignment operations based on one or more combinations of the one or more relevance scores and one or more coherence scores.

20. In some embodiments, a system comprises a memory storing instructions associated with a page generating engine, and a processor that is coupled to the memory and, when executing the instructions, is configured to determine, for each of a plurality of content items, an associated relevance score based on a user input, assign one or more content items included in the plurality of content items to one or more lists of content items based on one or more relevance scores associated with the one or more content items, wherein each list of content items is associated with a predefined collection of content items, generate a page that indicates the one or more lists of content items, and cause the page to be displayed via a user interface.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method or computer program product. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a ""module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine. The instructions, when executed via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable gate arrays.

The flowchart and block diagrams in the Figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

What is claimed is:

1. A computer-implemented method, comprising:
    determining, for each of a plurality of content items, a respective relevance score based on a user input;
    assigning the plurality of content items to a plurality of lists of content items based on the respective relevance scores, wherein each list of content items is associated with a respective predefined collection of content items;
    in response to identifying a first list of content items having more than a threshold quantity of content items, generating a plurality of candidate lists by removing the first list of content items from the plurality of lists of content items;
    for each candidate list included in the plurality of candidate lists:
        determining a respective overall relevance score based on the relevance scores of the content items included in the candidate list,
        generating a respective projected layout of a respective structured page that includes the candidate list, and
        evaluating the respective projected layout based on at least one display constraint;
    selecting at least one candidate list included in the plurality of candidate lists based on the respective overall relevance scores and the evaluations of the respective projected layouts;
    generating a structured page that includes the at least one candidate list; and
    causing the structured page to be displayed via a user interface, wherein the structured page displays a subset of content items included in the at least one candidate list based on the user interface.

2. The computer-implemented method of claim 1, wherein determining the respective relevance score comprises processing the user input via a machine learning model.

3. The computer-implemented method of claim 2, further comprising training the machine learning model based on one or more other user inputs and one or more user interactions with the plurality of content items.

4. The computer-implemented method of claim 1, wherein determining the respective relevance score comprises performing one or more lexical matching operations.

5. The computer-implemented method of claim 1, wherein determining the respective relevance score comprises processing the user input via a search engine.

6. The computer-implemented method of claim 1, further comprising mapping each of the plurality of content items to one or more predefined collections.

7. The computer-implemented method of claim 1, wherein assigning the plurality of content items to the plurality of lists of content items comprises performing one or more optimization operations.

8. The computer-implemented method of claim 7, wherein the one or more optimization operations include one or more greedy assignment operations based on the respective relevance scores.

9. The computer-implemented method of claim 7, further comprising:
   determining, for each content item included in the plurality of content items, one or more coherence scores based on similarities between the content item and other content items that map to one or more predefined collections that the content item maps to,
   wherein the one or more optimization operations include one or more assignment operations based on one or more combinations of the respective relevance scores and one or more coherence scores.

10. The computer-implemented method of claim 1, wherein causing the structured page to be displayed comprises transmitting the structured page to a client device that displays the structured page.

11. One or more non-transitory computer-readable storage media including instructions that, when executed by one or more processing units, cause the one or more processing units to perform the steps of:
   determining, for each of a plurality of content items, a respective relevance score based on a user input;
   assigning the plurality of content items to a plurality of lists of content items based on the respective relevance scores, wherein each list of content items is associated with a respective predefined collection of content items;
   in response to identifying a first list of content items having more than a threshold quantity of content items, generating a plurality of candidate lists by removing the first list of content items from the plurality of lists of content items;
   for each candidate list included in the plurality of candidate lists:
      determining a respective overall relevance score based on the relevance scores of the content items included in the candidate list,
      generating a respective projected layout of a respective structured page that includes the candidate list, and
      evaluating the respective projected layout based on at least one display constraint;
   selecting at least one candidate list included in the plurality of candidate lists based on the respective overall relevance scores and the evaluations of the respective projected layouts;
   generating a structured page that includes the at least one candidate list; and
   causing the structured page to be displayed via a user interface, wherein the structured page displays a subset of content items included in the at least one candidate list based on the user interface.

12. The one or more non-transitory computer-readable storage media of claim 11, wherein determining the respective relevance score comprises processing the user input via a machine learning model.

13. The one or more non-transitory computer-readable storage media of claim 12, wherein the instructions, when executed by the one or more processing units, further cause the one or more processing units to perform the step of training the machine learning model based on one or more other user inputs and one or more user interactions with the plurality of content items.

14. The one or more non-transitory computer-readable storage media of claim 11, wherein determining the respective relevance score comprises performing one or more lexical matching operations.

15. The one or more non-transitory computer-readable storage media of claim 11, wherein determining the respective relevance score comprises processing the user input via a search engine.

16. The one or more non-transitory computer-readable storage media of claim 11, wherein the instructions, when executed by the one or more processing units, further cause the one or more processing units to perform the step of mapping each of the plurality of content items to one or more predefined collections.

17. The one or more non-transitory computer-readable storage media of claim 11, wherein assigning the plurality of content items to the plurality of lists of content items comprises performing one or more optimization operations.

18. The one or more non-transitory computer-readable storage media of claim 17, wherein the one or more optimization operations include one or more greedy assignment operations based on the respective relevance scores.

19. The one or more non-transitory computer-readable storage media of claim 17, wherein the instructions, when executed by the one or more processing units, further cause the one or more processing units to perform the step of:
   determining, for each content item included in the plurality of content items, one or more coherence scores based on similarities between the content item and other content items that map to one or more predefined collections that the content item maps to,
   wherein the one or more optimization operations include one or more assignment operations based on one or more combinations of the respective relevance scores and one or more coherence scores.

20. A system comprising:
   a memory storing instructions associated with a structured page generating engine; and
   a processor that is coupled to the memory and, when executing the instructions, is configured to:
      determine, for each of a plurality of content items, a respective relevance score based on a user input;
      assign the plurality of content items to a plurality of lists of content items based on the respective relevance scores, wherein each list of content items is associated with a respective predefined collection of content items;
      in response to identifying a first list of content items having more than a threshold quantity of content items, generate a plurality of candidate lists by removing the first list of content items from the plurality of lists of content items;
      for each candidate list included in the plurality of candidate lists:

determine a respective overall relevance score based on the relevance scores of the content items included in the candidate list, generate a respective projected layout of a respective structured page that includes the candidate list, and evaluate the respective projected layout based on at least one display constraint;

select at least one candidate list included in the plurality of candidate lists based on the respective overall relevance scores and the evaluations of the respective projected layouts;

generate a structured page that includes the at least one candidate list; and cause the structured page to be displayed via a user interface, wherein the structured page displays a subset of content items included in the at least one candidate list based on the user interface.

\* \* \* \* \*